United States Patent
Shibata et al.

(10) Patent No.: US 8,084,509 B2
(45) Date of Patent: Dec. 27, 2011

(54) PRE-EXPANDED PARTICULATE POLYPROPYLENE-BASED RESIN AND IN-MOLD EXPANSION MOLDED ARTICLE

(75) Inventors: Tetsuya Shibata, Osaka (JP); Tomonori Iwamoto, Osaka (JP)

(73) Assignee: Kaneka Corporation, Osaka (JP)

( * ) Notice: Subject to any disclaimer, the term of this patent is extended or adjusted under 35 U.S.C. 154(b) by 555 days.

(21) Appl. No.: 11/791,344

(22) PCT Filed: Nov. 18, 2005

(86) PCT No.: PCT/JP2005/021303
§ 371 (c)(1),
(2), (4) Date: May 22, 2007

(87) PCT Pub. No.: WO2006/054727
PCT Pub. Date: May 26, 2006

(65) Prior Publication Data
US 2008/0039588 A1    Feb. 14, 2008

(30) Foreign Application Priority Data
Nov. 22, 2004 (JP) .................................. 2004-336835

(51) Int. Cl.
*C08J 9/16* (2006.01)
*C08J 9/00* (2006.01)
*B29C 44/30* (2006.01)

(52) U.S. Cl. .............. 521/59; 521/56; 521/142; 521/60; 521/57; 525/240

(58) Field of Classification Search ............... 521/59, 521/56, 60, 142, 57; 525/240
See application file for complete search history.

(56) References Cited

U.S. PATENT DOCUMENTS

| | | | | |
|---|---|---|---|---|
| 4,510,031 | A | * | 4/1985 | Matsumura et al. ......... 521/50.5 |
| 4,761,431 | A | * | 8/1988 | Nakamura ....................... 521/60 |
| 5,763,498 | A | * | 6/1998 | Knaus ............................. 521/60 |
| 6,166,096 | A | * | 12/2000 | Ichimura et al. ................ 521/59 |
| 6,355,696 | B1 | | 3/2002 | Yamaguchi et al. |
| 2001/0016610 | A1 | * | 8/2001 | Maletzko et al. .............. 521/56 |
| 2003/0124335 | A1 | * | 7/2003 | Sasaki et al. ............... 428/316.6 |
| 2004/0249004 | A1 | * | 12/2004 | Coppini et al. ................. 521/56 |
| 2005/0113473 | A1 | | 5/2005 | Wada |

FOREIGN PATENT DOCUMENTS

| | | |
|---|---|---|
| JP | 58-145739 | 8/1983 |
| JP | 60-235850 | 11/1985 |
| JP | 10-251437 | 9/1998 |
| JP | 11-209502 | 3/1999 |
| JP | 2000-327825 | 11/2000 |
| JP | 2002-167460 | 6/2002 |
| JP | 2002-275299 | 9/2002 |
| JP | 2003-335892 | 11/2003 |
| JP | 2004-211065 | 7/2004 |
| WO | WO 02/32985 A1 | 4/2002 |
| WO | WO 03/037971 A2 | 5/2003 |

* cited by examiner

*Primary Examiner* — Vasu Jagannathan
*Assistant Examiner* — Irina Krylova
(74) *Attorney, Agent, or Firm* — Hamre, Schumann, Mueller & Larson, P.C.

(57) ABSTRACT

The present invention provides a pre-expanded particulate polyolefin-based resin capable of easily attaining satisfactory secondary expandability, satisfactory surface appearance, and satisfactory dimensional stability even when it is intended to obtain an in-mold expansion molded article having a thin-wall shape. The present invention provides a pre-expanded particulate polypropylene-based resin including a polypropylene-based resin X as a base resin, where the resin X includes a resin mixture of at least a polypropylene-based resin A having a melting point of 140° C. or lower and a polypropylene-based resin B having a melting point of 145° C. or higher, and the resin mixture is modified by an organic peroxide so as to have a melt index of 5 g/10 min or more and less than 20 g/10 min.

19 Claims, 1 Drawing Sheet

PRE-EXPANDED PARTICULATE POLYPROPYLENE-BASED RESIN AND IN-MOLD EXPANSION MOLDED ARTICLE

This application is a National stage application from the International Patent Application No. JP2005/21303, filed on Nov. 18, 2005, and claims the foreign priority to the Japanese Patent Application No. 2004-336835, filed on Nov. 22, 2004.

TECHNICAL FIELD

The present invention relates to a pre-expanded particulate polypropylene-based resin and an in-mold expansion molded article. More specifically, the present invention relates to a pre-expanded particulate polypropylene-based resin that make it possible easily to obtain a satisfactory surface appearance and filling property in an in-mold expansion molded article having a thin wall, which has hitherto been assumed difficult to be actualized, and relates to an in-mold expansion molded article formed from the pre-expanded particles.

BACKGROUND ART

A polypropylene-based resin in-mold expansion molded article is superior in chemical resistance, heat resistance, shock absorption and compressive strain rebound as compared to a polystyrene-based resin in-mold expansion molded article, and is also superior in heat resistance and compressive strength as compared to a polyethylene-based resin in-mold expansion molded article. Therefore, such polypropylene-based in-mold expansion molded articles are used widely as shock absorbing packaging materials, returnable containers and automotive parts.

Particularly, since polypropylene-based resin in-mold expansion molded articles can be molded flexibly as various shapes of shock absorbing packaging materials in conformity with the shapes of commercial goods and parts to be packaged without requiring cutting work, the polypropylene-based resin in-mold expansion molded articles are used widely for electronic machines, industrial materials and the like.

Polypropylene-based resin molded articles can be molded in various shapes. However, because the temperature range for molding to obtain satisfactory products is narrow as compared to a case of polystyrene or the like, engineers must be skilled in molding techniques including regulation of the heating steam pressure, regulation of the heating time and regulation of the cooling time in molding. When a molded article of complicated shape should be obtained, if there is such a thin and narrow shaped portion that is a so-called thin-wall portion to accommodate only a few pre-expanded particles along the thickness direction, it is difficult to obtain a satisfactory shape and satisfactory surface appearance. Consequently, in such a portion, failures such as insufficient shock absorption and insufficient strength and the poor fusion of the pre-expanded particles may occur easily, thus imposing severe constraints on the shape design. As for the in-mold expansion molding using a pre-expanded particulate polypropylene-based resin, generally, due to the use of raw materials having low resin melting points, the secondary expandability (secondary expansion ratio) tends to increase when steam heating is carried out. As a result, for shaping a thin-wall, the use of a resin having a low melting point can be a measure for solving the above-described problem. However, the surfaces of the molded articles tend to have plenty of wrinkles and the rebound of the molded articles from the shrinkage after molding is insufficient in many cases. Also in a molding process for obtaining box-shaped molded articles, a so-called "fall-inward" phenomenon occurs easily. The "fall-inward" means a phenomenon in which a difference is raised between the edge portion dimension and the central portion dimension in a box-shaped molded article. The absolute value of this difference varies depending on the sizes of individual designed products. When the fall-inward is large, the molded articles are defective and not useful products.

In view of the above-described problems, for example, a method of modifying a resin surface has been proposed (Patent Document 1). According to this method, for obtaining pre-expanded particles having preferable secondary expandability and fusion property from pre-expanded polyolefin-based particles for in-mold expansion molding, a polypropylene-based resin is dispersed in a dispersion medium containing an organic peroxide. However, in this method, equipment to deal with the metal corrosion by the organic peroxide is required, and the dispersion medium tends to be non-uniform, and the product quality tends to be varied.

For the purpose of improving secondary workability, there is disclosed a method of using a mixture of a polypropylene-based resin and a propylene-α-olefin-based resin having a specific Vicat softening point (Patent Document 2). However, this method shows no effects of improving the secondary expandability and fusion property and suppressing the fall-inward.

In Patent Document 3, it has been found that a pre-expanded particulate polypropylene-based resin based on a resin having a specific melt index obtained by mixing resins each having a specific melt index is satisfactory with respect to surface appearance and fusion, but no specific description is presented as to whether such a pre-expanded particle can be applied or not to a molded article having a thin-wall shape requiring a higher secondary expandability and a higher fusion property.

[Patent Document 1] JP 2002-167460 A
[Patent Document 2] JP H10-251437 A
[Patent Document 3] JP 2000-327825 A

DISCLOSURE OF INVENTION

Problem to be Solved by the Invention

An object of the present invention is to provide a pre-expanded particulate polypropylene-based resin for in-mold expansion molding, which can provide a polypropylene-based resin in-mold expansion molded article having a preferable secondary expandability, surface appearance and dimensional stability, in production of various shapes of articles including those of complicated shapes.

Means for Solving Problem

In view of the above-described circumstances, the present inventors have made diligent investigations repeatedly, and have obtained the following findings. That is, in an attempt to obtain a molded article having a complicated shape in order to solve the above-described problems, a resin mixture comprising at least a polypropylene-based resin having a resin melting point of 140° C. or lower and a polypropylene-based resin having a resin melting point of 145° C. or higher is used. The resin mixture is modified to have a predetermined melt index value with the aid of an organic peroxide, and thus, the resin mixture turns into a base resin. Consequently, the lower temperature side resin ingredient is melted due to the steam heating at the time of the molding process, but the higher temperature side resin ingredient contributing to the shape retention is not melted, and the fluidity of the molten resin due to the steam heating can be enhanced. Thus, the present invention has been achieved.

More specifically, a first aspect of the present invention relates to a pre-expanded particulate polypropylene-based resin comprising a polypropylene-based resin X as a base resin, where the resin X comprises a resin mixture comprising at least a polypropylene-based resin A having a melting point of 140° C. or lower and a polypropylene-based resin B having a melting point of 145° C. or higher, and the resin mixture is modified with an organic peroxide so as to have a melt index of 5 g/10 min or more and less than 20 g/10 min.

A preferred embodiment relates to the pre-expanded particulate polypropylene-based resin comprising as a base resin the polypropylene-based resin X in which:
(1) in the polypropylene-based resin X, the polypropylene-based resin A in a content of 60 wt % or more and 95 wt % or less and the polypropylene-based resin B in a content of 5 wt % or more and 40 wt % or less;
(2) two melting points in the melting point measurement of the pre-expanded particles by differential scanning calorimetry, and the difference between the two melting points being 20° C. or more; and
(3) a peak with the largest endotherm and a shoulder situated on the higher temperature side of the peak in differential scanning calorimetry for the melting point thereof.

A second aspect of the present invention relates to a polypropylene-based resin in-mold expansion molded article formed by applying an internal pressure of 0.1 kg/cm$^2$-G or more to the above-described pre-expanded particulate polypropylene-based resin, filling into a mold that can be closed but cannot be sealed, and heating with steam.

Effects of the Invention

The present invention can provide a pre-expanded particulate polypropylene-based resin that easily can yield variously shaped molded articles involving complicated shapes without impairing the heat resistance, solvent resistance, heat insulation property and shock absorption that are possessed inherently by the polypropylene-based resin itself, because the pre-expanded particulate polypropylene-based resin has satisfactory secondary expandability and excellent surface appearance and dimensional stability. Accordingly, there can be provided pre-expanded particulate polypropylene-based resin that may be used suitably in wide varieties of applications as shock absorbing materials, heat insulating materials and automotive parts.

Figure 1:
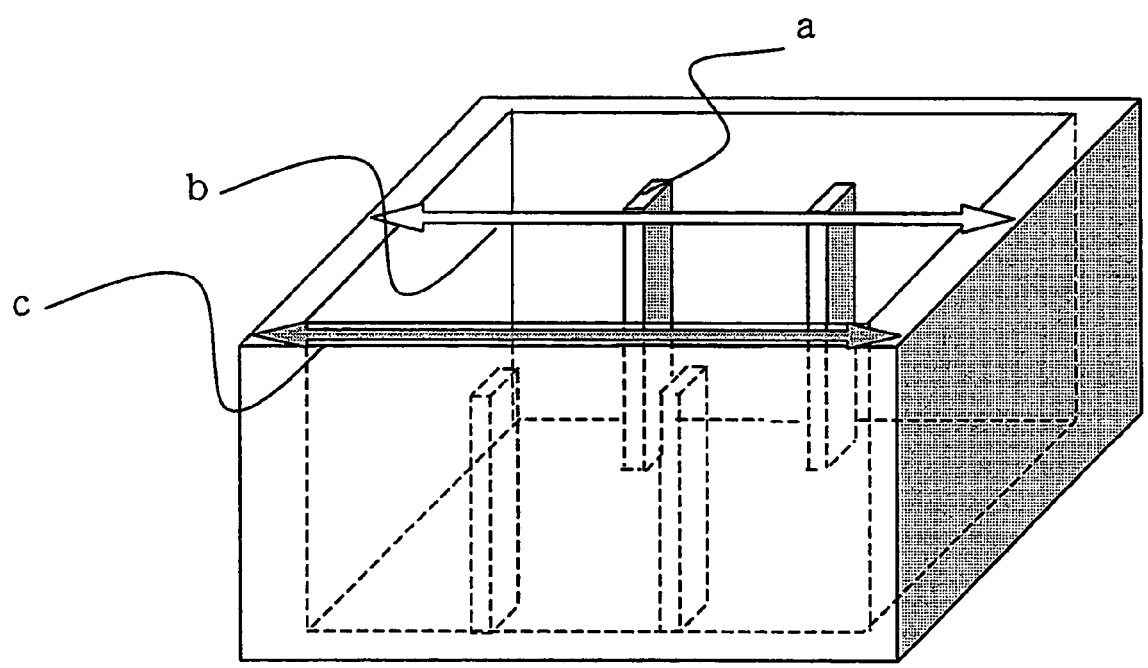
FIG. 1 is a perspective view illustrating a box-shaped molded article used for molding evaluation in an example of the present invention.

EXPLANATION OF LETTERS AND NUMERALS a Thin-wall site
b A portion for measuring a central portion dimension
c A portion for measuring an edge portion dimension

BEST MODE FOR CARRYING OUT THE INVENTION

There is no particular limitation for the polypropylene-based resin according to the present invention with respect to the composition and the synthesis method thereof, as long as it comprises propylene as monomer in a content of 80 wt % or more, more preferably 85 wt % or more, and furthermore preferably 90 wt % or more. Examples of such a polypropylene-based resin include propylene homopolymer, ethylene-propylene random copolymer, propylene-butene random copolymer, ethylene-propylene block copolymer and ethylene-propylene-butene ternary copolymer. Examples may also include polymers treated with an organic peroxide for the purpose of regulating the molecular weight distribution and the melt index as required.

A polypropylene-based resin X to be the base resin of the polypropylene-based pre-expanded particles of the present invention comprises at least a polypropylene-based resin A having a resin melting point of 140° C. or lower and a polypropylene-based resin B having a resin melting point of 145° C. or higher.

The polypropylene-based resin A of the present invention, in the polypropylene-based resin X to form the pre-expanded particles, has a resin melting point of 140° C. or lower and preferably 138° C. or lower, and is expected to contribute significantly to the melting and the mutual fusion of the particles at the time of the secondary expansion by steam heating. Therefore, for the purpose of obtaining a molded article having a thin-wall shape, the polypropylene-based resin A content in the polypropylene-based resin X is preferably 60 wt % or more and 95 wt % or less, and more preferably 70 wt % or more and 95 wt % or less. When the content is less than 70 wt %, the secondary expandability tends to be insufficient, and the moldability of the thin-wall portions sometimes tends to be degraded. When the content exceeds 95 wt %, degradation in the dimensional stability due to shrinkage and the like and the fall-inward phenomenon may occur easily.

The polypropylene-based resin B of the present invention has a resin melting point of 145° C. or higher and preferably 147° C. or higher. Since the polypropylene-based resin B has a melting point at the higher temperature side, it is expected to significantly contribute to shape retention and dimensional stability in the course of steam heating in the polypropylene-based resin X to form the pre-expanded particles. It is expected accordingly in an attempt to obtain a molded article of a box-shape for example where the fall-inward phenomenon might be observed, the polypropylene-based resin B content in the polypropylene-based resin X is preferably 5 wt % or more and 40 wt % or less, and more preferably 5 wt % or more and 30 wt % or less. When the content is less than 5 wt %, the fall-inward phenomenon will occur easily, and when the content exceeds 40 wt %, the moldability of the thin-wall portions tends to be degraded.

Here, the resin melting points of the polypropylene-based resins A and B indicate the crystal melting peaks where the endothermic values of these resins respectively are maximal in the DSC curves obtained when these resins are melted by raising the temperature from 40° C. to 210° C. at a rate of 10° C./min by differential scanning calorimetry (DSC).

The resin mixture according to the present invention comprising the polypropylene-based resin A and the polypropylene-based resin B is modified with the aid of an organic peroxide so as to have a melt index of 5 g/10 min or more and 20 g/min or less, and preferably 5 g/10 min or more and 15 g/min or less. When the melt index falls within the above-described ranges, both a high secondary expandability and a satisfactory dimensional stability can be realized. The secondary expandability may be degraded when the melt index is less than 5 g/10 min, and when the melt index exceeds 20 g/10 min, the dimensional stability may be degraded.

The potential effects provided by the organic peroxides in the present invention include not only the modification of the melt index but the molecular chain scission of the high molecular weight polypropylenes. It is regarded that due to the decrease in the contents of the high molecular weight components, the fluidity of the resin itself is improved, and satisfactory secondary expandability and beautiful surface appearance can be obtained. Due to the above-described advantageous effects, even for the case where the melt index falls within the above-described ranges in a mixing without addition of an organic peroxide, the addition of the organic peroxide makes it easy to obtain advantageous effects in solving the above-described problems. There is no particular limitation for the organic peroxide to be used, and examples of the organic peroxides may include: ketone peroxides such as methyl ethyl ketone peroxide and methyl acetoacetate peroxide; peroxyketals such as 1,1-bis(t-butylperoxy)-3,3,5-trimethylcyclohexane, 1,1-bis(t-butylperoxy)cyclohexane, n-butyl-4,4-bis(t-butylperoxy)valerate and 2,2-bis(t-butylperoxy)butane; hydroperoxides such as permethane hydroperoxide, 1,1,3,3-tetramethylbutyl hydroperoxide, diisopropylbenzene hydroperoxide and cumene hydroperoxide; dialkyl peroxides such as dicumyl peroxide, 2,5-dimethyl-2,5-di(t-butylperoxy)hexane, α,α'-bis(t-butylperoxy-m-isopropyl)benzene, t-butylcumyl peroxide, di-t-butyl peroxide and 2,5-dimethyl-2,5-di(t-butylperoxy)hexine-3; diacyl peroxides such as benzoyl peroxide; peroxy dicarbonates such as di(3-methyl-3-methoxybutyl)peroxy dicarbonate and di-2-methoxybutylperoxy dicarbonate; and peroxy esters such as t-butylperoxy octate, t-butylperoxy isobutylate, t-butylperoxy laurate, t-butylperoxy-3,5,5-trimethyl hexanoate, t-butylperoxy isopropyl carbonate, 2,5-dimethyl-2,5-di(benzoylperoxy)hexane, t-butylperoxy acetate, t-butylperoxy benzoate and di-t-butylperoxy isophthalate.

Another polypropylene-based resin and/or another synthetic resin other than polypropylene-based resin may be added within a range not impairing the advantageous effects of the present invention when the polypropylene-based resin A and the polypropylene-based resin B are mixed together to prepare the resin mixture, and/or to the propylene-based resin X. Examples of another synthetic resin other than polypropylene-based resin include: ethylenic resins such as high density polyethylene, medium density polyethylene, low density polyethylene, straight chain low density polyethylene, straight chain ultralow density polyethylene, ethylene-vinyl acetate copolymer, ethylene-acrylic acid copolymer and ethylene-methacrylic acid copolymer; and styrenic resins such as polystyrene, styrene-maleic anhydride copolymer and styrene-ethylene copolymer.

Also as required, for example, additives may be added to the base resin within ranges not impairing the advantageous effects of the present invention. The examples include: a nucleating agent such as talc; stabilizers such as an antioxidant, a metal deactivator, a phosphorus-based processing stabilizer, an ultraviolet absorber, an ultraviolet stabilizer, a fluorescent brightener and a metal soap; a cross-linking agent, a chain transfer agent, a lubricant, a plasticizer, a filler, a reinforcing agent, a pigment, a dye, a flame retardant, an antistatic agent and the like.

For the purpose of obtaining the pre-expanded particulate polypropylene-based resin, the base resin is processed into resin particles. For example, in the present invention, the polypropylene-based resin A, the polypropylene-based resin B, an organic peroxide and the like, together with the above-described additives to be added as required, are melt-mixed in advance by use of an extruder, kneader, Banbury mixer, a roller or the like, to be processed into particulate polypropylene-based resin having a desired particle shape such as a cylindrical, elliptic cylindrical, spherical, cubic or rectangular parallelepiped shape, and having a particle weight of preferably 0.2 to 10 mg, and more preferably 0.5 to 6 mg.

An example of a method of expanding the above-described polypropylene-based resin particles into pre-expanded particles, for example has steps of: dispersing the polypropylene-based resin particles in water together with a volatile foaming agent in a pressure vessel so as to prepare a polypropylene-based resin dispersion; heating the dispersion to a temperature in a range of $-25°$ C.$\leq M \leq +10°$ C., and more preferably in a range of $-20°$ C.$\leq M \leq +5°$ C. so as to impregnate the volatile foaming agent in the polypropylene-based resin particles where M denotes the melting point of the polypropylene-based resin particles, and discharging the dispersion of the polypropylene resin particles and the water under an atmosphere of a pressure lower than inside the vessel, while retaining the temperature and pressure to be constant in the vessel under application of pressure no lower than the vapor pressure of the volatile foaming agent, thereby the pre-expanded particulate polypropylene-based resin can be obtained. However, the method concerned is not limited to this method.

In the preparation of the dispersion, it is preferable to use, as dispersing agents, inorganic dispersing agents such as tribasic calcium phosphate, basic magnesium carbonate and calcium carbonate and also auxiliary dispersing agents such as sodium dodecylbenzenesulfonate, sodium n-paraffinsulfonate and sodium α-olefinsulfonate. Among these, tribasic calcium phosphate and sodium dodecylbenzenesulfonate more preferably are used in combination. The used amounts of the dispersing agent and auxiliary dispersing agent vary depending on the types thereof and the type and used amount of the used polypropylene-based resin. Preferably, the dispersing agent is added in a content of 0.2 to 3 parts by weight, and the auxiliary dispersing agent is added in a content of 0.001 parts by weight or more and 0.1 parts by weight or less per 100 parts by weight of water. It is usually preferable to use the particulate polypropylene-based resin in a content of 20 parts by weight or more and 100 parts by weight or less per 100 parts by weight of water for the purpose of attaining satisfactory dispersibility thereof in water.

Examples of the applicable volatile foaming agents include hydrocarbons or halogenated hydrocarbons having boiling points of $-50$ to $120°$ C. Specific examples thereof include propane, butane, pentane, hexane, dichlorodifluoromethane, dichlorotetrafluoroethane, trichlorotrifluoroethane, methyl chloride, methylene chloride and ethyl chloride. These are used each alone or in combinations of two or more thereof. There is no particular limitation on the amounts of these volatile foaming agents, and the used amounts can be set in consideration of the types of the foaming agents and the ratio between the resin amount inside the vessel and the internal space volume of the vessel. Preferably, the used amount thereof is 5 parts by weight or more and 50 parts by weight or less with respect to 100 parts by weight of the particulate polypropylene-based resin.

In addition to the method using the above-described volatile foaming agents, an example of available methods for economically producing the pre-expanded particulate polypropylene-based resin is a method in which, for example, a hydrophilic compound is contained in the polypropylene-based resin, and the water to be used as the dispersion medium is used as a foaming agent (for example, JP H10-306179 A and H11-106576 A).

The expansion ratio of the thus obtained pre-expanded particulate polypropylene-based resin is preferably 10 times or more and 50 times or less, and more preferably 15 times or more and 40 times or less. When the expansion ratio falls within the above-described ranges, the lightweight and satisfactory compressive strength as the advantages of the expanded article subjected to in-mold expansion-molding process will be attained. The cell diameter of the pre-expanded particulate polypropylene-based resin is preferably 50 μm or more and 1000 μm or less, more preferably 50 μm or more and 750 μm or less, and further preferably 100 μm or more and 500 μm or less. When the cell diameters are within these ranges, the moldability and dimensional stability tend to be improved.

In the melting point measurement of the pre-expanded particles by differential scanning calorimetry (DSC), the pre-expanded particulate polypropylene-based resin of the present invention has two melting points in the DSC curve obtained with 4 to 10 mg of an expanded particulate sample by increasing the temperature from 40° C. to 210° C. at a rate of 10° C./min, one being the melting point (hereinafter, referred to as the lower temperature side melting point TL) obtained from the melting peak based on the crystalline state originally possessed by the base resin and the other being the melting point (hereinafter, referred to as the higher temperature side melting point TH) obtained from a melting peak observed on the higher temperature side of the lower temperature side melting point; the difference between these melting points, namely, TH-TL (hereinafter, referred to as the DSC peak difference) is preferably 20.0° C. or more, and more preferably 22° C. or more. No particular upper limit is set for this difference but practically a value of 35.0° C. is the upper limit attainable through production. When the DSC peak difference is less than 20.0° C., the molding condition ranges such as the pressure and temperature ranges of the heating steam tend to be narrowed, and/or satisfactory secondary expandability and satisfactory dimensional stability will not be obtained easily.

With the melting peak heat quantity α(J/g) of the melting peak (hereinafter, referred to as the low temperature peak) based on the crystalline state originally possessed by the base resin of the pre-expanded particulate polypropylene-based resin of the present invention and the melting peak heat quantity β(J/g) of the melting peak (hereinafter, referred to as the high temperature peak) observed on the higher temperature side of the low temperature peak, the ratio of the melting peak heat quantity based on the high temperature side melting point to the sum of the melting peak heat quantities of all the melting peaks (β/(α+β) (hereinafter, referred to as the DSC peak ratio as the case may be) is preferably 10% or more and 50% or less, and more preferably 15% or more and 45% or less. When the DSC peak ratio falls within the above-described range, the balance between high secondary expandability and shape retention can be attained easily, and the sufficient molding processing width can be obtained easily.

In the resin melting point measurement by differential scanning calorimetry (DSC), the resin melting point is defined as follows: after the thermal history of heating 4 to 10 mg of expanded particulate sample from 40° C. to 210° C. at a rate of 10° C./min to be once melted and then cooling from 210° C. to 40° C. at a rate of 10° C./min, the sample is again heated from 40° C. to 210° C. at a rate of 10° C./min and melted to give a DSC curve. The crystal melting peak observed as a peak of the maximum endothermic value in this DSC curve is taken to be located at the resin melting point.

As for the polypropylene-based resin X of the present invention, the resin properties thereof are preferably such that the resin melting point is preferably 130° C. or higher and 160° C. or lower, and more preferably 130° C. or higher and 155° C. or lower. When the resin melting point falls within the ranges, a sufficiently fused in-mold expansion molded article can be obtained by using a conventional mold structure and a molding machine, and an in-mold expansion molded article having a satisfactory compressive strength can be obtained.

In the resin melting point measurement of the present invention based on differential scanning calorimetry, it is preferable that a peak or a shoulder is observed on the higher temperature side of the crystal melting peak for which the endothermic value is maximal. In other words, in the present invention, it is preferable that there are a crystal structure to melt at a lower temperature and another crystal structure to melt at a higher temperature, and the crystal melting peak preferably has a shoulder on the higher temperature side thereof.

The molded article of the present invention is obtained from the pre-expanded particulate polypropylene-based resin of the present invention, using the in-mold expansion molding method.

Examples of available methods for processing the pre-expanded particulate polypropylene-based resin of the present invention into the molded article include: (a) the expanded particles are subjected to a pressurizing treatment with an inorganic gas so as to impregnate the particles with the inorganic gas to impart a predetermined internal pressure to the particles, then the particles are filled into a mold, and then the particles are fused by heating with steam or the like (for example, a method described in Japanese Utility Model Publication S51-22951); and (b) the expanded particles are pressurized with a gas pressure and then filled into a mold so as to be fused by heating with steam or the like with the aid of the rebound force of the particles (for example, Japanese Utility Model Publication S53-33996). Among them, in a preferred method, the particles of the pre-expanded particulate polypropylene-based resin is subjected to an internal pressure of 9.8 kPa-gage (0.1 kg/cm$^2$-G) or more, filled into a mold that can be closed but cannot be sealed, and molded with heat of steam. According to this method a box-shaped molded article having a thin-wall shape can be molded easily to have a beautiful appearance. It is preferable that the density of the thus obtained molded article of the present invention falls within a range from 0.012 to 0.075 g/cm$^3$. A molded article having a density falling within this range has the light-weight that is characteristic to an in-mold expansion molded article, and hardly causes shrinkage and deformation at the time of molding to decrease the defective product ratio, and hence the productivity may be satisfactory By appropriately regulating the expansion ratio and the secondary expansion ratio at the time of in-mold expansion molding of the pre-expanded particulate polypropylene-based resin, an in-mold expansion molded article having a desired density can be obtained.

EXAMPLES

In the following, the present invention will be described in detail with reference to examples, but the present invention is not limited only to these examples.

<Resin Melting Point Measurement of the Base Resin>

In the differential scanning calorimetry (DSC), the resin melting point is defined as follows. After the thermal history of heating 4 to 10 mg of expanded particulate sample from 40° C. to 210° C. at a rate of 10° C./min to be once melted and then cooling from 210° C. to 40° C. at a rate of 10° C./min, the sample is again heated from 40° C. to 210° C. at a rate of 10° C./min and melted to give a DSC curve. The crystal melting peak observed as a peak of the maximum endothermic value in this DSC curve is taken to be located at the resin melting point.

<Melting Point Measurement of Pre-Expanded Particles>

In the differential scanning calorimetry (DSC), in the DSC curve obtained when 4 to 10 mg of expanded particulate sample is melted by raising the temperature from 40° C. to 210° C. at a rate of 10° C./min, a melting point obtained from the melting peak on the lower temperature side is taken as the lower temperature side melting point (hereinafter, referred to as TL, as the case may be), and a melting point obtained from the melting peak observed on the higher temperature side of the lower temperature side melting point is taken as the higher temperature side melting point (hereinafter, referred to as TH, as the case may be). The difference between TL and TH is represented by Δt.

<Resin Melting Point Measurement for Other Cases>

In the differential scanning calorimetry (DSC), in the DSC curve obtained when 4 to 10 mg of expanded particulate sample is melted by raising the temperature from 40° C. to 210° C. at a rate of 10° C./min, the crystal melting peak for which the endothermic value is maximal is taken as the resin melting point.

<Melt Index Measurement>

For the melt index measurement, an MFR measurement apparatus described in JIS-K7210 is used. The melt index value is a value measured under the conditions of an orifice of 2.0959±0.005 mmφ, the length of the orifice of 8.000±0.025 mm, a load of 2160 g, and 230±0.2° C.

<Expansion Ratio Measurement>

From the weight of the pre-expanded particles to constitute a sample and the volume measured by submerging the sample in the ethanol in a measuring flask, the density of the pre-expanded particles is derived, and the base resin density is divided by the thus obtained density to provide the expansion ratio.

<Secondary Expansion Ratio Measurement>

The secondary expansion ratio in the present invention is a physical property value obtained by the following measurement procedures.

(1) The bulk density $\rho_1$ of the pre-expanded particles under vacuum is measured.

(2) Inorganic dispersing agent is applied sufficiently on the surface of the pre-expanded particles, as a treatment for preventing the pre-expanded particles from fusing each other due to steam heating.

(3) The pre-expanded particles treated in (2) are placed in a container having a structure such as a wire net to allow a sufficient action of heating of the pre-expanded particles by steam, the container is placed in a molding machine (for example, P110 (manufactured by Toyo Kinzoku Co., Ltd.)), heated for 5 seconds at a steam pressure of 294 kPa-gage (3.0 kgf/cm²-G), and then cooled with water for 50 seconds.

(4) The inorganic dispersing agent adhering to the surface of the taken-out pre-expanded particles is washed out, and the pre-expanded particles are dried in a thermostatic chamber at 75° C. for 12 hours.

(5) The bulk density $\mu_2$ of the pre-expanded particles under vacuum after the drying is measured, and the secondary expansion ratio $X_2=\rho_1/\rho_2$ (times) is derived from $\rho_1$ that indicates the bulk density of the pre-expanded particles under vacuum in (1) and $\rho_2$.

The above-described operations are carried out twice on each of the specimens, and the average value is taken as the secondary expansion ratio.

<Molding Evaluation>

In the molding evaluation, molding is carried out by use of a mold having a shape shown in FIG. 1 (the outside design dimension of the molded article: 327 mm×353 mm×256 mm; the dimension of the thin-wall portion: 103 mm×153 mm×5 mm) and under the heating steam pressures of 196 kPa-gage (2.0 and 3.0 kgf/cm²-G) and 294 kPa-gage (3.0 kgf/cm²-G). Then, the surface a of the thin-wall portion and the dimension c (the central portion along the longitudinal direction) are evaluated. In FIG. 1, a denotes a think wall site, b denotes a portion for measuring a central portion dimension, and c denotes a portion for measuring an edge portion dimension. In the present invention, the 'complicated shape' denotes the shape as shown in FIG. 1 for example.

(1) Surface Appearance

The surface appearance evaluation of the surface of a molded article obtained as follows is made as described below. The pre-expanded particles are subjected to an internal pressure of 9.8 kPa-gage (0.1 kg/cm²-G) or more, filled into a mold that can be closed but cannot be sealed, and heated with steam under a pressure of 294 kPa-gage (3.0 kgf/cm²-G) to provide the molded article.

'G' denotes a case of an article, where all the contours of the expanded particles appearing on the surface a of the molded article are fused to the adjacent particles, and no wrinkles are found on the surface of the expanded particles exposed on the surface of the molded article.

'P' denotes a case of an article, where voids are found between the expanded particles, or wrinkles are found on the surface of the expanded particles exposed on the surface of the molded article.

(2) Dimensional Stability

After molding by heating with steam under a pressure of 294 kPa-gage (3.0 kgf/cm²-G), the molded article is allowed to stand at 25° C. for 2 hours, then allowed to stand in a thermostatic chamber with a temperature regulated at 65° C. for 5 hours, then taken out therefrom, and then allowed to stand to cool at 25° C. On each of three molded article specimens thus obtained, the dimension (b) is measured; the difference between the average value of the (b) values thus obtained and the required quality dimension 345 mm is derived; the case where the difference from the required quality dimension falls within a range from −2.0 to +2.0 mm is taken as acceptable.

<Overall Evaluation>

'G' denotes that both the surface appearance and dimensional stability are acceptable, and 'P' denotes any other results in the evaluations.

Example 1

With respect to a resin prepared by mixing 90 parts by weight of an ethylene-propylene random copolymer (resin density: 0.90 g/cm³; resin melting point: 138.0° C.) and 10 parts by weight of another ethylene-propylene random copolymer (resin density: 0.90 g/cm³; resin melting point: 147.0° C.), 0.1 part by weight of powdery talc and 0.3 part by weight of an organic peroxide (PERHEXA® 25B, manufactured by NOF Corp.) were dry-blended per 100 parts by weight of the above-mentioned resin. The thus obtained blend was extruded from a 50-mm single screw extruder set at 200° C. into resin particles of an ethylene-propylene random copolymer (resin density: 0.90 g/cm³; melt flow index: 13.0 g/10 min; resin melting point: 144.0° C.) having a weight of 1.3 mg/particle. In a 10-L pressure vessel equipped with a stirrer, 100 parts by weight (50 kg) of the thus obtained resin particles were placed, and dispersed in 300 parts by weight of water in the presence of 2.0 parts by weight of tribasic calcium phosphate (manufactured by Taihei Chemical Industrial Co., Ltd.) and 0.03 parts by weight of sodium n-paraffinsulfonate. To the thus obtained dispersion liquid, 18 parts by weight of isobutane was added while stirring the dispersion liquid, and the dispersion liquid was heated to 141.5° C. At this time, gaseous isobutane was added to regulate the pressure inside the pressure vessel to be 1.73 MPa-gage (17.7 kgf/cm$^2$). Next, while the pressure inside the pressure vessel was being maintained with gaseous isobutane, pellets and the aqueous dispersion liquid were discharged into the air through a circular orifice of 4 mm in diameter fixed at the rear end of a discharge valve of 25 mm in inner diameter to obtain pre-expanded particles having an expansion ratio of 25.6 times, a DSC peak ratio of 31%, and a Δt value of 21.7° C. The secondary expansion ratio of the pre-expanded particles was 2.75 times. A molding was made with the thus obtained pre-expanded particles to obtain a molded article having satisfactory surface appearance and satisfactory dimensional stability.

vessel was regulated to be 1.74 MPa-gage (17.8 kgf/cm$^2$). The secondary expansion ratio of the pre-expanded particles was 2.10 times. A molding was made with the thus obtained pre-expanded particles so as to obtain a molded article in which the fusion of the surface particles of the molded article was somewhat unsatisfactory.

Example 2

Pre-expanded particles having an expansion ratio of 24.4 times, a DSC peak ratio of 25% and a Δt value of 26.3° C. were obtained in the same manner as in Example 1 except that a resin prepared by mixing together 80 parts by weight of an ethylene-propylene random copolymer (resin density: 0.90 g/cm$^3$; resin melting point: 131.0° C.) and 20 parts by weight of another ethylene-propylene random copolymer (resin density: 0.90 g/cm$^3$; resin melting point: 147.0° C.) were used in place of using the resin used in Example 1. 0.1 part by weight of the powdery talc and 0.4 part by weight of the organic peroxide were dry-blended with the resin thus prepared, the

TABLE 1

| | PP-A | PP-B | | Organic peroxide | PP-X | | | |
|---|---|---|---|---|---|---|---|---|
| | Resin melting point (° C.) | Resin melting point (° C.) | Mixing ratio PP-A/ PP-B | Added amount (parts by weight) | Melt index (g/ 10 min) | Resin melting point (° C.) | Heating temp. (kgf/cm$^2$) | Pressure (kgf/cm$^2$) |
| Ex. 1 | 138 | 147 | 90/10 | 0.3 | 13.0 | 141.5 | 144.0 | 17.7 |
| Ex. 2 | 131 | 147 | 80/20 | 0.4 | 15.8 | 139.0 | 136.9 | 17.6 |
| Ex. 3 | 138 | 147 | 50/50 | 0.3 | 7.8 | 142.0 | 144.2 | 17.5 |
| Ex. 4 | 138 | 157 | 80/20 | 0.2 | 16. | 145.3 | 159.6 | 25.5 |
| Ex. 5 | 138 | 162 | 80/20 | 0.2 | 9.9 | 149.3 | 165.4 | 25.1 |
| Co. 1 | 138 | 147 | 90/10 | 0 | 9.8 | 138.5 | 141.2 | 17.8 |
| Co. 2 | 131 | — | 100/0 | 0 | 6.7 | 124.0 | 130.5 | 17.1 |
| Co. 3 | 131 | — | 100/0 | 0.4 | 17.4 | 124.0 | 130.3 | 17.4 |
| Co. 4 | 131 | 138 | 70/30 | 0 | 7.0 | 126.9 | 133.2 | 17.3 |

| | Pre-expanded particle | | | Secondary expansion ratio (times) | Molding evaluation | | |
|---|---|---|---|---|---|---|---|
| | Expansion ratio (times) | DSC peak ratio (%) | Δt (° C.) | | Surface appearance G or P | Dimensional stability (mm) | Overall evaluation G, M or P |
| Ex. 1 | 25.6 | 31 | 21.7 | 2.75 | G | −0.5 | G |
| Ex. 2 | 24.4 | 25 | 26.3 | 3.02 | G | −1.2 | G |
| Ex. 3 | 25.5 | 25 | 20.5 | 2.45 | G | −1.8 | G |
| Ex. 4 | 26.2 | 26 | 25.5 | 2.65 | G | −0.2 | G |
| Ex. 5 | 25.7 | 30 | 31.2 | 2.53 | G | −0.7 | G |
| Co. 1 | 26.5 | 29 | 21.6 | 2.10 | P | −1.1 | P |
| Co. 2 | 26.2 | 25 | 18.3 | 1.51 | P | −4.4 | P |
| Co. 3 | 25.4 | 25 | 17.4 | 0.94 | P | −6.3 | P |
| Co. 4 | 25.1 | 25 | 20.1 | 1.21 | P | −3.6 | P |

Ex.: Example;
Co.: Comparative Example

Comparative Example 1

Pre-expanded particles having an expansion ratio of 26.5 times and a DSC peak ratio of 29% were obtained in the same manner as in Example 1 except that kneading with the extruder was carried out without adding the organic peroxide which was added at the time of blending in Example 1, and an ethylene-propylene random copolymer (resin density: 0.90 g/cm$^3$; melt flow index: 9.8 g/10 min; resin melting point: 141.2° C.) was thereby obtained, the dispersion liquid was heated to 138.5° C., and the pressure inside the pressure thus obtained blend was kneaded with the extruder to obtain resin particles of an ethylene-propylene random copolymer (resin density: 0.90 g/cm$^3$; melt flow index: 15.8 g/10 min; resin melting point: 136.9° C.), the dispersion liquid was heated to 139.0° C., and the pressure inside the pressure vessel was regulated to be 1.72 MPa-gage (17.6 kgf/cm$^2$). The secondary expansion ratio of the pre-expanded particles was 3.02 times. A molding was made with the thus obtained pre-expanded particles to obtain a molded article having satisfactory surface appearance and satisfactory dimensional stability.

Comparative Example 2

Pre-expanded particles having an expansion ratio of 26.2 times and a DSC peak ratio of 25% were obtained in the same manner as in Example 1 except that 100 parts by weight of an ethylene-propylene random copolymer (resin density: 0.90 g/cm$^3$; resin melting point: 131.0° C.) was used in place of the resin used in Example 2. 0.1 part by weight of the powdery talc was dry-blended alone with the copolymer, and the thus obtained blend was kneaded with the extruder to obtain an ethylene-propylene random copolymer (resin density: 0.90 g/cm$^3$; melt flow index: 6.7 g/10 min; resin melting point: 130.5° C.), the dispersion liquid was heated to 124.0° C., and the pressure inside the pressure vessel was regulated to be 1.68 MPa-gage (17.1 kgf/cm$^2$). The secondary expansion ratio of the pre-expanded particles was 1.51 times. A molding was made with the thus obtained pre-expanded particles to obtain a molded article exhibiting poor fusion of the surface particles of the molded article and large dimensional shrinkage.

Comparative Example 3

A pre-expanded particle having an expansion ratio of 25.4 times and a DSC peak ratio of 25% was obtained in the same manner as in Example 1 except that 100 parts by weight of an ethylene-propylene random copolymer (resin density: 0.90 g/cm$^3$; resin melting point: 131.0° C.) was used in place of the resin used in Example 2. 0.1 part by weight of the powdery talc and 0.4 part by weight of the organic peroxide were added to and blended with the copolymer, the thus obtained blend was kneaded with the extruder to obtain an ethylene-propylene random copolymer (resin density: 0.90 g/cm$^3$; melt flow index: 17.4 g/10 min; resin melting point: 130.3° C.), the dispersion liquid was heated to 124.0° C., and the pressure inside the pressure vessel was regulated to be 17.5 kgf/cm$^2$. The secondary expansion ratio of the pre-expanded particles was 0.94 times. A molding was made with the thus obtained pre-expanded particles to obtain a molded article exhibiting poor fusion of the surface particles of the molded article and an extremely large dimensional shrinkage.

Comparative Example 4

Pre-expanded particles having an expansion ratio of 25.1 times, a DSC peak ratio of 25% and a Δt value of 20.1° C. were obtained in the same manner as in Example 2 except that 70 parts by weight of an ethylene-propylene random copolymer (resin density: 0.90 g/cm$^3$; resin melting point: 131.0° C.) and 30 parts by weight of another ethylene-propylene random copolymer (resin density: 0.90 g/cm$^3$; resin melting point: 138.0° C.) were used in place of the resin used in Example 2. 0.1 part by weight of the powdery talc was added alone to and blended with these copolymers, the thus obtained blend was kneaded with the extruder to obtain an ethylene-propylene random copolymer (resin density: 0.90 g/cm$^3$; melt flow index: 7.0 g/10 min; resin melting point: 133.2° C.), the dispersion liquid was heated to 126.9° C., and the pressure inside the pressure vessel was regulated to be 1.70 MPa-gage (17.3 kgf/cm$^2$). The secondary expansion ratio of the pre-expanded particles was 1.21 times. A molding was made with the thus obtained pre-expanded particles to obtain a molded article exhibiting poor fusion of the surface particles of the molded article and an extremely large dimensional shrinkage.

Example 3

Pre-expanded particles having an expansion ratio of 25.5 times, a DSC peak ratio of 25% and a Δt value of 20.5° C. were obtained in the same manner as in Example 1 except that a resin prepared by mixing 50 parts by weight of an ethylene-propylene random copolymer (resin density: 0.90 g/cm$^3$; resin melting point: 138.0° C.) and 50 parts by weight of another ethylene-propylene random copolymer (resin density: 0.90 g/cm$^3$; resin melting point: 147.0° C.) was used in place of the resin used in Example 1. 0.1 part by weight of the powdery talc and 0.3 part by weight of the organic peroxide similarly were added to and dry-blended with 100 parts by weight of the resin thus prepared, the thus obtained blend was kneaded with the extruder to obtain an ethylene-propylene random copolymer (resin density: 0.90 g/cm$^3$; melt flow index: 7.8 g/10 min; resin melting point: 144.2° C.), the dispersion liquid was heated to 142.0° C., and the pressure inside the pressure vessel was regulated to be 1.72 MPa-gage (17.5 kgf/cm$^2$). The secondary expansion ratio of the pre-expanded particles was 2.45 times. A molding was made with the thus obtained pre-expanded particles to obtain a molded article exhibiting satisfactory fusion of the surface particles of the molded article and an acceptable level of dimensional shrinkage.

Example 4

Pre-expanded particles having an expansion ratio of 26.2 times, a DSC peak ratio of 26% and a Δt value of 25.5° C. were obtained in the same manner as in Example 1 except that a resin prepared by mixing 80 parts by weight of an ethylene-propylene random copolymer (resin density: 0.90 g/cm$^3$; resin melting point: 138.0° C.) and 20 parts by weight of another ethylene-propylene random copolymer (resin density: 0.90 g/cm$^3$; resin melting point: 157.0° C.) was used in place of the resin used in Example 1. 0.1 part by weight of the powdery talc and 0.2 part by weight of the organic peroxide were similarly added to and dry-blended with 100 parts by weight of the resin thus prepared, the thus obtained blend was kneaded with the extruder to obtain an ethylene-propylene random copolymer (resin density: 0.90 g/cm$^3$; melt flow index: 16.1 g/10 min; resin melting point: 145.3° C.), the dispersion liquid was heated to 159.6° C., and the pressure inside the pressure vessel was regulated to be 2.50 MPa-gage (25.5 kgf/cm$^2$). The secondary expansion ratio of the pre-expanded particles was 2.65 times. A molding was made with the thus obtained pre-expanded particles to obtain a molded article exhibiting satisfactory fusion of the surface particles of the molded article and an acceptable level of dimensional shrinkage.

Example 5

Pre-expanded particles having an expansion ratio of 25.7 times, a DSC peak ratio of 30% and a Δt value of 31.2° C. were obtained in the same manner as in Example 1 except that a resin prepared by mixing 80 parts by weight of an ethylene-propylene random copolymer (resin density: 0.90 g/cm$^3$; resin melting point: 138.0° C.) and 20 parts by weight of another ethylene-propylene random copolymer (resin density: 0.90 g/cm$^3$; resin melting point: 162.0° C.) was used in place of the resin used in Example 1. 0.05 part by weight of the powdery talc and 0.2 part by weight of the organic peroxide were similarly added to and dry-blended with 100 parts by weight of the resin thus prepared, the thus obtained blend was kneaded with the extruder to obtain an ethylene-propylene random copolymer (resin density: 0.90 g/cm$^3$; melt flow index: 9.9 g/10 min; resin melting point: 149.3° C.), the dispersion liquid was heated to 165.4° C., and the pressure inside the pressure vessel was regulated to be 2.46 MPa-gage (25.1 kgf/cm²). The secondary expansion ratio of the pre-expanded particles was 2.53 times. A molding was made with the thus obtained pre-expanded particles to obtain a molded article exhibiting satisfactory fusion of the surface particles of the molded article and an acceptable level of dimensional shrinkage.

The invention claimed is:

1. A pre-expanded particulate polypropylene-based resin comprising a resin X,
wherein said resin X consists of:
a polypropylene-based resin A having a melting point of 140° C. or lower; and
a polypropylene-based resin B having a melting point of 145° C. or higher, and said resin X is modified by melt-extruding together with an organic peroxide so as to have a melt index of 5 g/10 min or more and less than 20 g/10 min,
wherein said resin X contains polypropylene-based resin A in a content of 60 wt % or more and 95 wt. % or less and the polypropylene-based resin B in a content of 5 wt % or more and 40 wt % or less,
wherein the melt index of said modified resin X is higher in comparison with a melt index of an unmodified resin X to which the organic peroxide is not added, and
wherein no resin other than said resin X is present.

2. The pre-expanded particulate polypropylene-based resin according to claim 1 having two melting points in a melting point measurement of the pre-expanded particles of said resin X, and the difference between said melting points is 20° C. or more.

3. The pre-expanded particulate polypropylene-based resin according to claim 1 having a peak with the largest endotherm and a shoulder situated on the higher temperature side of said peak in differential scanning calorimetry for the melting point of said resin X.

4. The pre-expanded particulate polypropylene-based resin according to claim 1, wherein said resin X is a resin of a propylene homopolymer or a copolymer comprising propylene as a monomer in a content of 80 wt % or more.

5. The pre-expanded particulate polypropylene-based resin according to claim 4, wherein the copolymer resin comprising the propylene in a content of 80 wt % or more is at least one resin selected from the group consisting of ethylene-propylene random copolymer, propylene-butene random copolymer, ethylene-propylene block copolymer and ethylene-propylene-butene random copolymer.

6. The pre-expanded particulate polypropylene-based resin according to claim 1, wherein the organic peroxide is at least one selected from the group consisting of ketone peroxide, peroxyketal, hydroperoxide, dialkyl peroxide, diacyl peroxide, peroxy dicarbonate and peroxy ester.

7. The pre-expanded particulate polypropylene-based resin according to claim 1, having an expansion ratio of 10 times or more and 50 times or less.

8. The pre-expanded particulate polypropylene-based resin according to claim 1, wherein said resin X has a melting point of 130° C. or higher and 160° C. or lower.

9. A polypropylene-based resift in-mold expansion molded article produced by:
applying an internal pressure of 9.8 kPa-gage (0.1 kg/cm²-G) or more to a pre-expanded particulate polypropylene-based resin comprising a resin comprising a resin X,
wherein said resin X consists of:
a polypropylene-based resin A having a melting point of 140° C. or lower; and
a polypropylene-based resin B having a melting point of 145° C. or higher, and said resin X is modified by melt-extruding together with organic peroxide so as to have a melt index of 5 g/10 min or more and less than 20 g/10 min,
wherein said resin X contains polypropylene-based resin A in a content of 60 wt % or more and 95 wt % or less and the polypropylene-based resin B in a content of 5 wt % or more and 40 wt % or less,
wherein the melt index of said modified resin X is higher in comparison with a melt index of an unmodified resin X to which the organic peroxide is not added, and
wherein no resin other than said resin X is present; and
filling said pre-expanded particulate polypropylene-based resin into a mold that can be closed but cannot be sealed; and
heating said pre-expanded particulate polypropylene-based resin with steam for molding.

10. The polypropylene-based resin in-mold expansion molded article according to claim 9, wherein the molded article has a density in a range of 0.012 g/cm³ to 0.075 g/cm³.

11. The polypropylene-based resin in-mold expansion molded article according to claim 9, wherein said pre-expanded particulate polypropylene-based resin has two melting points in a melting point measurement of the pre-expanded particles of said resin X, and the difference between said melting points is 20° C. or more.

12. The polypropylene-based resin in-mold expansion molded article according to claim 9, wherein the pre-expanded particulate polypropylene-based resin has a peak with the largest endotherm and a shoulder situated on the higher temperature side of said peak in differential scanning calorimetry for the melting point of said resin X.

13. The polypropylene-based resin in-mold expansion molded article according to claim 9, wherein said resin X is a resin of a propylene homopolymer or a copolymer comprising propylene as a monomer in a content of 80 wt % or more.

14. The polypropylene-based resin in-mold expansion molded article according to claim 9, wherein the organic peroxide is at least one selected from the group consisting of ketone peroxide, peroxyketal, hydroperoxide, dialkyl peroxide, diacyl peroxide, peroxy dicarbonate and peroxy ester.

15. The polypropylene-based resin in-mold expansion molded article according to claim 9, wherein the pre-expanded particulate polypropylene-based resin has an expansion ratio of 10 times or more and 50 times or less.

16. The polypropylene-based resin in-mold expansion molded article according to claim 9, wherein Said resin X has a melting point of 130° C. or higher and 160° C. or lower.

17. A method of producing a polypropylene-based resin in-mold expansion molded article, the method comprising steps of:
applying an internal pressure of 9.8 kPa-gage (0.1 kg/cm²-G) or more to a pre-expanded particulate polypropylene-based resin comprising a resin X,
wherein said resin X consists of:
a polypropylene-based resin A having a melting point of 140° C. or lower; and
a polypropylene-based resin B having a melting point of 145° C. or higher, and said resin X is modified by melt-extruding together with an organic peroxide so as to have a melt index of 5 g/10 min or more and less than 20 g/10 min,
wherein said resin X contains polypropylene-based resin A in a content of 60 wt % or more and 95 wt % or less and the polypropylene-based resin. B in a content 5 wt % or more and 40 wt % or less, wherein the melt index of said modified resin X is higher in comparison with a melt index of an unmodified resin X to which the organic peroxide is out added, and wherein no resin other than said resin X is present;

filling said pre-expanded particulate polypropylene-based resin into a mold that can be closed but cannot be sealed; and heating said pre-expanded particulate polypropylene-based resin with steam for molding.

18. The method of producing a polypropylene-based resin in-mold expansion molded article according to claim 17, wherein the pre-expanded particulate polypropylene-based resin has an expansion ratio of 10 times or more and 50 times or less.

19. A method of producing a pre-expanded particulate polypropylene-based resin, the method comprising the steps of:

preparing resin particles comprising a resin X, wherein said resin X consists of:

a polypropylene-based resin A having a melting point of 140° C. or lower, and a polypropylene-based resin B having a melting point of 145° C. or higher, and said resin X is modified by melt-extruding, together with an organic peroxide so as to have a melt index of 5 g/10 min or more and less than 20 g/10 min, wherein said resin X contains polypropylene-based resin A in a content of 60 wt % or more and 95 wt % or less and the polypropylene-based resin B in a content of 5 wt % or more and 40 wt % or less, wherein the melt index of said modified resin X is higher in comparison with a melt index of an unmodified resin X to which the organic peroxide is not added, and wherein no resin other than said resin X is present;

dispersing said particulate resin X together with a foaming agent in water in a pressure vessel so as to prepare a polypropylene-based resin dispersion;

heating the polypropylene-based resin dispersion to temperature in a range of M−25° C. M+10° C., where M denotes a melting point of said particulate resin X so as to impregnate the foaming agent in said particulate resin X; and discharging the dispersion of said particulate resin X and the water under an atmosphere with pressure lower than that inside the vessel, while retaining the temperature and the pressure to be constant in the vessel by applying pressure no lower than vapor pressure of the foaming agent to the vessel.

\* \* \* \* \*